United States Patent [19]

Bonitz et al.

[11] Patent Number: 4,740,915

[45] Date of Patent: Apr. 26, 1988

[54] METHOD OF CONTROLLING A MICROPROCESSOR TO MONITOR INPUT SIGNALS AT IRREGULAR MUTUALLY INTERSECTING INTERVALS

[75] Inventors: Jörg Bonitz, Mühlacker; Robert Entenmann, Benningen; Rochus Knab, Kornwestheim; Bernhard Miller, Stuttgart; Siegfried Rohde, Schwieberdingen; Herbert Schramm, Stuttgart; Walter Viess, Illingen, all of Fed. Rep. of Germany

[73] Assignee: Robert Bosch GmbH, Stuttgart, Fed. Rep. of Germany

[21] Appl. No.: 844,270

[22] Filed: Mar. 28, 1986

Related U.S. Application Data

[63] Continuation of Ser. No. 507,695, Jun. 24, 1983, abandoned.

[30] Foreign Application Priority Data

Jun. 28, 1982 [DE] Fed. Rep. of Germany ....... 3234030

[51] Int. Cl.⁴ .................. G06F 9/22; G06F 15/00; G05D 13/02
[52] U.S. Cl. .................. 364/900; 364/431.11; 364/431.07; 377/26
[58] Field of Search ... 364/200 MS File, 900 MS File, 364/424, 431.02, 431.03, 431.04, 431.07, 431.11, 431.12, 565, 569; 377/16, 20, 26, 45, 54; 123/416, 417, 480, 486, 487

[56] References Cited

U.S. PATENT DOCUMENTS

| | | | |
|---|---|---|---|
| 4,128,892 | 12/1978 | Vasa | 364/900 |
| 4,250,858 | 2/1981 | Jeenicke et al. | 123/480 |
| 4,276,601 | 6/1981 | Tokuda et al. | 364/431.05 |
| 4,281,388 | 7/1981 | Friend et al. | 364/565 |
| 4,372,274 | 2/1983 | Takase | 364/431.04 X |
| 4,399,354 | 8/1983 | Schaeffer | 377/26 |
| 4,442,812 | 4/1984 | Mizuno et al. | 123/480 |
| 4,442,815 | 4/1984 | Ninomiya | 364/431.05 |
| 4,458,308 | 7/1984 | Holtey et al. | 364/200 |
| 4,527,248 | 7/1985 | Takase et al. | 364/565 |

FOREIGN PATENT DOCUMENTS 2034500 6/1980 United Kingdom .......... 364/431.03

OTHER PUBLICATIONS

Intel: Single Component 8-Bit Microcomputer, pp. 5-20 to 5-28, 1979.
Single Component MCS-48 System, pp. 12-2 to 12-12.

*Primary Examiner*—Raulfe B. Zache
*Assistant Examiner*—Thomas C. Lee
*Attorney, Agent, or Firm*—Frishauf, Holtz, Goodman & Woodward

[57] ABSTRACT

Control of a microcomputer performing a wide variety of functions in a motor vehicle in which the sequences of input and output signals intersect in time, instead of being performed by an elaborate input/output unit, is performed in the microcomputer itself with the help of a timing signal generator operating at a sub-multiple of the microcomputer clock frequency and producing a sequence of timing signals, each of which serve as an interrupt signal to the microprocessor of the microcomputer to initiate an interrupt program for scanning inputs and preparing outputs. After this short interrupt program, the main program is resumed. In the interrupt program each of a number of registers, respectively serving separate inputs or outputs, are decremented or incremented, having been set at particular values at the beginning of each interrupt program. Some registers are set at two different values in alternation in succeeding interrupt intervals. Engine speed determination is produced by counting the number of interrupt signals during the passage of a prolonged signal representing a certain angle of shaft rotation. The frequency of timing signals is varied in steps in accordance with engine speed.

17 Claims, 2 Drawing Sheets

METHOD OF CONTROLLING A MICROPROCESSOR TO MONITOR INPUT SIGNALS AT IRREGULAR MUTUALLY INTERSECTING INTERVALS

This application is a continuation of application Ser. No. 507,695, filed June 24, 1983, now abandoned.

This invention concerns a method of controlling a microcomputer in operations in which it must accept two or more input signals and/or must provide various output signals at irregular and mutually intersecting intervals.

Microcomputers are used today in very complex control apparatus in which they have to fulfill a multiplicity of diverse functions. hus, for example, a microcomputer for concurrent control of ignition and fuel injection in a gasoline engine is disclosed in U.S. Pat. No. 4,250,858.

When various output signals must be produced and, especially if in addition different input magnitudes are to be taken account of, the control of the microcomputer becomes highly problematic if these different events intersect each other irregularly in time. It is then difficult to determine which operation should be carried out next, especially if the sequence is not always the same.

In order to solve the problem just mentioned, it is known, for example, to dispose of various functions, particularly countering functions outside of the microcomputer in an input/output unit that supplements the microcomputer. This solution of the problem involves an expensive and complicated input/output circuit equipped with a multiplicity of counters. It is necessary, then, moreover, to fit the unit for each of the intended control functions and to the data to be taken into account. It is therefore not surprising that the resulting arrangement is complicated and extensive.

It is an object of the present invention to provide for the mutual intersection in time of the various sequences of events involved at the inputs and outputs of a microcomputer in a manner far simpler than heretofore accomplished and to do so in a way capable of making use of the microcomputer's own capabilities so far as possible, so that, at least to a great extent, the control system can utilize functions already within the repertoir of the microcomputer.

SUMMARY OF THE INVENTION

Briefly, a source of timing signals of a frequency substantially lower than the microcomputer clock frequency, which can easily be derived from the latter, is utilized to provide interrupt signals to the microcomputer at short regular intervals. These same timing signals are arranged to increment or decrement a number of individual registers respectively related to the several input and output signals of the mutually intersecting sequences, either continuously and therefore essentially directly or else in the presence of a particular input signal and, therefore, through an AND logic element.

Except in a case in which the register is reset by a signal derived from the input signals to which it is related, the registers are all set at appropriate initial values furnished by the microcomputer on every pulse of a sequence of pulses provided by the microcomputer, having a repetition rate much slower than the timing signals. Thus, at every interrupt signal an input can be interrogated for the presence of a signal while at the same time registers are incremented or decremented.

The invention has the advantage that a multiplicity of sequences of events intersecting each other irregularly can be controlled or ascertained. All that needs to be added is a simple sequence of timing signals utilized simultaneously for control and for ascertaining the presence of input signals. Thus at the same time a number of different time periods can be counted out and, in addition, the time duration of events can be ascertained. Counting out operations for determining the control time or for ascertaining input magnitudes can intersect each other in time in any desired way. Even asynchronous procedures are readily obtainable. Counting out of time periods is possible in relatively large amounts of time. In the entire range of operation a simple conversion or recalculation is feasible with a single byte, since no knowledge of the absolute period length (e.g. the rotary speed of an engine) is required.

A particularly useful version of the method of the invention involves loading one or more registers with two different initial values in alternation, so that an event can be evaluated with reference to upper and lower time limits. This can advantageously be used for separately determining the duration of an output signal and the interval between successive output signals.

It is also useful, particularly in automotive applications, for one register to be reset with one flank of each of the input signals to which it is related and to be incremented with every timing pulse during the presence of the signal, so that the resulting count can be utilized by the microcomputer (for example as a measure of engine speed). Further details and advantages are contained in the detailed description that follows.

BRIEF DESCRIPTION OF THE DRAWINGS

The invention is further described by way of illustrative example with reference to the annexed drawings, in which.

DESCRIPTION OF THE ILLUSTRATED EMBODIMENT

Figure 1:
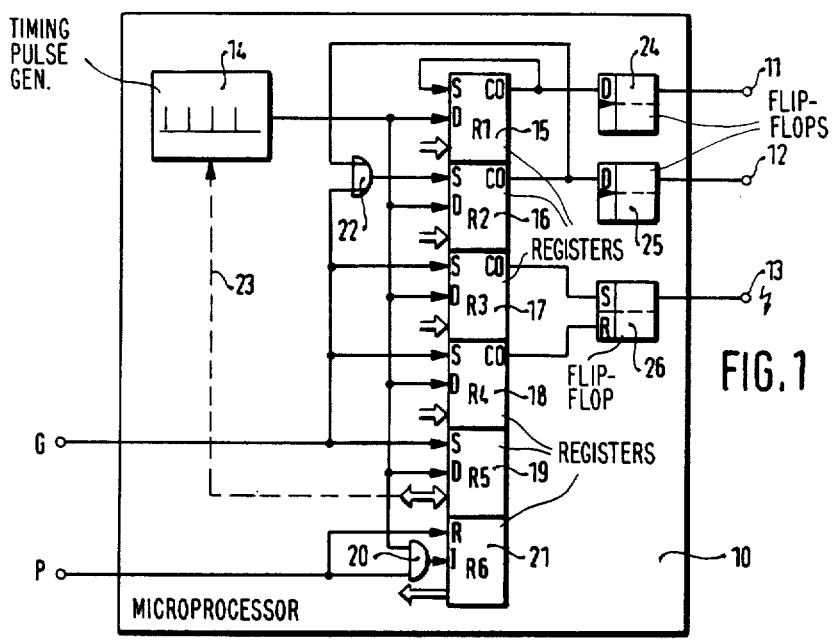
FIG. 1 is a partial schematic diagram of a microprocessor in the form of an equivalent circuit diagram.

FIG. 1 shows a microprocessor 10 which may be a component of a microcomputer which also comprises various memory blocks. two input magnitudes G and P are supplied to the microprocessor 10 and outputs of the microprocessor 10 are provided at three output terminals 11, 12, and 13, in the form of sequences of output signals at each of the terminals. For simplification of the illustration only those components of the microprocessor 10 are shown which are essential and useful for explanation of the method of control of the microprocessor in the nature of the functions involved therein. Not shown in the drawing, for example, are the central processing unit, the working store and fixed value store, the program control portion and various other component groups necessary for the function of a microprocessor and a microcomputer. The basic construction of a microprocessor and a microcomputer, including all of its components can be obtained from every data book put out on the subject by a manufacturer of microcomputers. In such handbooks there are also explained in detail the functions and the coordinated operation as well as the necessary programming of a microprocessor and of a microcomputer.

The components illustrated in FIG. 1 are timing pulse generator 14, the output of which is connected to downward counting inputs E (decrement inputs) respectively of five registers 15 to 19. These registers are also designated $R_1, R_2 \ldots R_5$. The output signals of the timing pulse generator 14 and the input signals P also have an AND correlation, illustrated as an AND-gate 20. The output of this AND-gate 20 is connected with the upwards counting input I (increment input) of another register 21 which also has the designation $R_6$.

The input signal G is supplied to the respective set inputs S of the registers 16, 17, 18 and 19. Furthermore the set input of the register 16 can be supplementarily activated by the overflow (carry out) output CO of this register, as is represented in FIG. 1 by the OR-gate 22. The CO output of the register 15 is connected with the set input S of this register.

The input signal P is also suppled to the reset input R of the register 21.

The data supply and removal to and from the registers 15 to 21 controlled by the microprocessor 10 is represented by corresponding broad arrows in the usual way. The broken line 23 represents the provision of an effect on the timing pulse generator 14 according to data provided by the register 19.

The CO outputs of the two registers 15 and 16 are respectively connected to the D flipflops 24 and 25 which in turn are connected respectively to the outputs 11 and 12. The CO outputs of the two registers 17 and 18 are respectively connected to the set and reset inputs of a flipflop 26, the output of which is connected to the terminal 13.

It should be made clear that the illustrated connection lines, logic elements and flipflops are usually realized in a microcomputer as functions and the actual connections are provided at least in part by bus connections. The kind of representation that has been chosen for FIG. 1 has been found advantageous for explanation of the manner of operation and may be regarded as an equivalent circuit illustrating the method of control of the microprocessor of a microcomputer.

Figure 2:
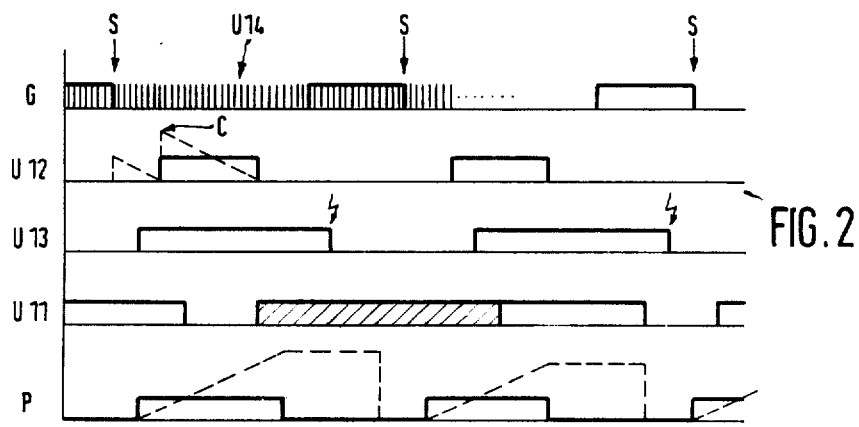
FIG. 2 is a signal timing diagram illustrating input and output signals of the microprocessor of FIG. 1.

FIG. 2 shows on a time graph the irregularly intersecting input and output signals. The signal G is a reference mark signal on the trailing edge of which the registers 16 to 19 are set to begin a working cycle. The input magnitude P is to have its length in time ascertained by the microprocessor 10. The output signals $U_{11}$, $U_{12}$ and $U_{13}$ are destined for the ignition system of an internal combustion engine, the example selected in this case: $U_{11}$ is an output signal sequence for control of a turbo supercharger, this sequence being asynchronous and controlled by the pause between pulses, $U_{12}$ provides a measuring window fixed with respect to crankshaft angle, used for engine knock control, and $U_{13}$ is a control signal for an ignition coil of an ignition system. Naturally, these signals that intersect each other in a manner dependent upon engine speed can also be utilized for other purposes as may be convenient. The generation of the output magnitudes $U_{11}$, $U_{12}$ and $U_{13}$ as well as the measurement of the input magnitude P are now to be provided by a single microcomputer. The decrementing or incrementing of the respective registers 15 to 21 takes place at the rhythm of the output signals $U_{14}$ of the timing signal generator 14. The frequency of these signals is derived from the clock frequency of the microprocessor 10 and can conveniently be a submultiple thereof.

Figure 3:
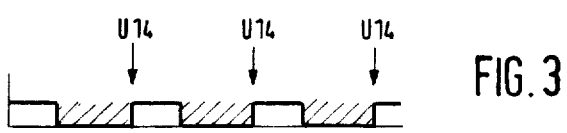
FIG. 3 is a signal timing diagram illustrating the interrupt events in the operation of the microprocessor of FIG. 1.

FIG. 3 shows on a larger scale a portion of the general course of events in the system. Each signal $U_{14}$ serves as an interrupt signal and interrupts the running program. The running of the program is designated by the diagonal shading in FIG. 3 and does not need to be further described here. As a consequence of a signal $U_{14}$, the running program is interrupted for the duration of the interrupt program. the latter is shown in detail in FIG. 4 and serves for decrementing or incrementing the respective registers 15 to 21 and the generation, as derived therefrom, of the output signals, as well as the detection and ascertainment of the input signal P. After completion of such an interrupt program there is a jumpback into the regular program for processing the data for the registers in dependence on the input magnitudes. The latter operation for the case of the enging ignition is in principle described in the above-cited U.S. Pat. No. 4,250,858 and does not need to be described in further detail here, since that data processing operation does not form part of the subject matter of the present invention.

Figure 4:
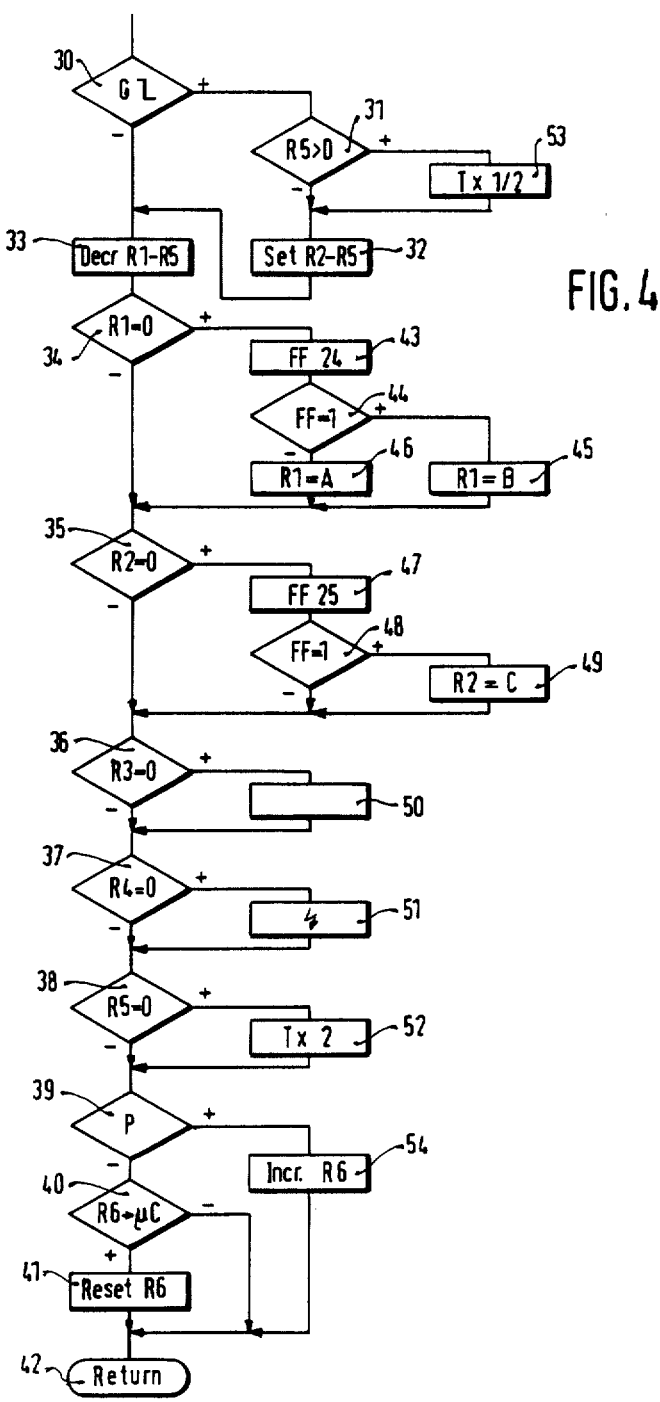
FIG. 4 is a flow diagram for explaining the method of control, in accordance with the invention, of the microprocessor of FIG. 1.

The flow diagram shown in FIG. 4 explains the course of the parallel decrementing or incrementing of the respective registers 15 to 21 in the framework of the interrupt program as well as the generation of the output signals and that ascertainment of the input signal P. The running of this interrupt program begins with each interrupt signal $U_{14}$.

The first step concerns the fixing of the frequency of the timing signal generator 14 (i.e. whether it should be raised or lowered) which is done only on the trailing edge of an input signal G. If that trailing edge is present (stage 30), a determination is made (stage 31) whether the content of the register 5 is greater than a prescribed count value D. If that is not the case, the registers $R_2$ to $R_5$ are set (stage 32) at respective count values provided by the microcomputer. Thereafter the registers $R_1$ to $R_5$ are decremented by the value 1 (stage 33). After that the determination is made whether the registers $R_1$ to $R_5$ have reached the value zero as the result of their decrementation (stages 34 to 38). This will not be the case during the first part of the interrupt program. Then the determination is made whether a signal P is present in accordance with FIG. 2. At first this is not the case and accordingly it is next determined whether the content of the register $R_6$ was already taken over by the microprocessor (state 40). If that has been done, the register $R_6$ is then reset (stage 41) and the return is then made to the main program (stage 42). The main program, as mentioned above, is represented in FIG. 3 by diagonal shading.

When the next interrupt signal $U_{14}$ comes, the trailing edge of the signal G will have passed and no such event will be found at this time, in consequence of which the course of the interrupt program runs through the stages 30 and 33 to 42 in sequence. This operation continues in this manner with decrementing of the registers $R_1$ to $R_5$ every time, until either one of the registers $R_1$ to $R_5$ has reached the value zero or until an input signal P appears. In what follows the different possibilities will now be considered one after the other.

The register $R_1$ serves for generation of a keying-ratio controlled asynchronous output signal for the turbo control. If the register $R_1$ has reached the value 0 (stage 34), the flipflop 24 is switched over stage (43). If it is thereafter set (stage 44), the register $R_1$ is set at the value B provided by the microprocessor (stage 45). If the flipflop 24, on the contrary, is not set, this register is loaded with the value A (stage 46). By this setting of the register $R_1$ with the values A and B in alternation, the pulse length and pause length of the signal sequence $U_{11}$ is determined and this can be varied practically as much as might be desired, as is represented by the shaded region of $U_{11}$ in FIG. 2.

The register $R_2$ serves for generation of a measurement window $U_{12}$ which is fixed with respect to crankshaft angle. This register is set (stage 32) after the signal G. When this register $R_2$ reaches the value zero, the flipflop 25 is switched over (stage 47). Since the signal G also is used as a reset signal for the microprocessor 10, this flipflop 25 is now in the set condition, as is ascertained in stage 48 of the interrupt program. The register $R_2$ is then loaded with the value C (stage 49) provided from the microprocessor. The decrementation of this value C by the following interrupt signals produces the signal length of a signal $U_{12}$. In this case, as in the case of the register $R_1$, an alternating setting of the register with two different values is utilized. In the case of register $R_2$, however, the setting of the first value is synchronized with the reference signal G, which is not the case for register $R_1$.

The registers $R_3$ and $R_4$ serve for defining the control signal $U_{13}$ for the ignition coil of an engine ignition system. When the register $R_3$ reaches the value zero, the ignition coil is put in circuit (stage 50). When the register $R_4$, which is loaded with a greater value, reaches the value zero the coil is again switched out (stage 51), thus producing ignition in the usual way. The register $R_3$, thus provides the beginning and the register $R_4$ the end of a signal $U_{13}$.

One function of the register $R_5$ is to measure engine speed and in consequence thereof to control the frequency of the timing pulse generator 14 and thereby the pulse sequence interval of the interrupt signal $U_{14}$. The register $R_5$ is loaded with a fixed count value at every trailing edge of a G signal. This fixed value corresponds substantially to the number of interrupt signals between two G signal trailing edges. If the register $R_5$ reaches the value zero, this signifies that the pulse spacing between two interrupt signals $U_{14}$ is too small. The pulse spacing T is consequently doubled (stage 52 of FIG. 4). If, on the contrary, if at the trailing edge of a signal G the content of $R_5$ is greater than some prescribed value D (as determined in stage 31 of FIG. 4), then the pulse spacing T is halved (stage 53). From the residual content of the register $R_5$ when the next trailing edge of a G signal passes, by reference to the given count number with which the register $R_5$ was set and also to the pulse spacing of the signals $U_{14}$, the absolute engine speed can then be calculated in the microprocessor 10.

The time-wise detection of the input signal P is performed by the register $R_6$. As soon as a signal P is detected (stage 39 in FIG. 4), this register $R_6$ is incremented (stage 54) at every run-through of the interrupt program of FIG. 4. After the termination of such a signal P, the incrementing of register $R_6$ is ended, the value reached is taken over into the microprocessor (stage 40) and thereafter the register $R_6$ is again set to the value 0 (stage 41). It is to be understood that the inventive concept here is not limited to the particular signals produced and accepted as above described. By means of a microprocessor or a microcomputer practically any kind of mutually intersecting synchronous or asynchronous signal sequences can be produced and responded to in accordance with the principles of the invention illustrated by the above-described example. Besides the application of the invention for control of an internal combustion engine (typically ignition and fuel injection) other vehicular applications are possible, such as transmission control, antiblocking functions of a brake system, driving enroute information, pickup and processing either in a single microcomputer or in a very small number of microcomputers. In addition there is a prospect of interesting applications of the invention for control of heating systems, machine tool control and complicated monitoring system control. It will therefore be evident that although the invention has been described with reference to a particular illustrative example, variations and modifications are possible within the inventive concept.

We claim:

1. Method of controlling a microprocessor having a program, data processing circuits including at least one accumulator, random access memory means of which a portion is constituted as a multiplicity of plural-bit storage registers, means for writing data into and reading data out of said registers under program control, a clock frequency source and clocking connections, interrupt and reset inputs and input and output ports respectively for a plurality of input signals and a plurality of output signals, said method serving for controlling said microprocessor in operations thereof which require taking input signals respectively at said input ports at irregular mutually intersecting intervals for initiation thereby of time-critical brief program routines and comprising the steps of:

assigning in said random access memory at least one said storage register for each of a plurality of said input signals present respectively at said input ports, each of said assigned registers having a carry out state recognizable by said microprocessor;

generating timing signals at a constant frequency substantially lower than said microprocessor clock frequency and using all of said timing signals as interrupt signals supplied to said interrupt input of said microprocessor for initiating a time-critical routine of altering the numerical content of each of said assigned registers;

immediately after the appearance, at said interrupt input, of each of said interrupt signals supplied at regular intervals, performing for at least one of a first portion of said assigned registers, the substeps of:

determining whether a first input signal (G) of said input signals is in a predetermined one of two possible states thereof after having been in the other of said two states right after the last previous one of said interrupt signals;

in the event when said first input signal is in said one predetermined state and was in said other state right after the last previous one of said interrupt signals, writing in a predetermined initial content value in said at least one of said first portion of said assigned registers;

in all other cases, determining whether said at least one register is in a carry out state; if so, producing a change of state in one of said output signals at one of said output ports and if not, transferring the content of said at least one register to an accumulator of said microprocessor, altering the value of said content of said at least one register by one unit in a predetermined direction of alteration and transferring said altered content to said at least one register; and thereafter returning the operation of said microprocessor to said program thereof at the stage of said program reached at the time of the said interrupt signal which initiated the substeps above recited.

2. Method according to claim 1, wherein said substeps preceding the return to said program further include:

reading at least one (21) of a second portion of said assigned registers if a second input signal (P) of said input signals is in a first predetermined state of two possible states thereof after having been in the second of said two states right after the last previous one of said interrupt signals; and resetting said at least one (21) register of said second portion of said assigned registers if said second input signal (P) of said input signals is in said second state thereof after having been in said first state thereof right after the last previous one of said interrupt signals.

3. Method according to claim 1 wherein, for at least one (15, 16) of said first portion (15–18) of said assigned registers, the substep which begins with determining whether a register is in a carry out state is performed, in the event said register is in a carry out state, with the addition of a substep of writing into said register a predetermined count value content.

4. Method according to claim 3 wherein said substep of writing in a predetermined count value content into said at least one register (15, 16) is performed by writing in different first and second count values in alternation in successive routines respectively initiated by successive interrupt signals supplied at regular intervals and wherein the recognition of said carry out state of said at least one register is used for timing the duration of a particular state of a corresponding one of said output signals and the length of an interval between successive occurrences of said particular state thereof.

5. Method according to claim 4, wherein said substeps performed prior to return to said program further include:

determining whether a first input signal (G) of said input signals is in a predetermined first state of two possible states thereof;

if said first input signal is in said first state, transferring the content of a first register (19) of a second portion of said assigned registers to an accumulator of said microprocessor, altering the value of said register content by one unit in a predetermined direction of alteration and transferring said altered content to said first register (19);

determining whether said first input signal (G) is in the second of its two possible states after having been in said first state thereof right after the last previous interrupt signal of said interrupt signals supplied at regular intervals and in that event reading out and storing the content of said first register (19) followed by restoring the content of said register to a predetermined initial count value content;

and wherein said program provides first and second limit values of the content read out of said first register (19) and provides for comparing said stored read out content of said first register after return of said microprocessor to said program and further provides, in response to the said comparing step, for reducing the frequency of said timing signals when said first limit value is reached after previous read out values lying between said limit values and for increasing the frequency of said timing signals when said second limit value is reached after previous readout values lying between said limit values.

6. Method according to claim 5 in which the step of reducing the frequency of said timing signals is performed by halving said frequency and the step of increasing said frequency is performed by doubling said frequency.

7. Method according to claim 5, wherein the step of increasing said frequency is made subject to an upper limit of said frequency.

8. Method according to claim 6, wherein said frequency of said timing signals is derived from the clock frequency of said microprocessor.

9. Method according to claim 1, wherein said frequency of said timing signals is derived from the clock frequency of said microprocessor.

10. Method of controlling a microprocessor having program, data processing circuits including at least one accumulator, random access memory means of which a portion is constituted as a multiplicity of plural-bit storage registers, means for writing data into and reading data out of said registers under program control, a clock frequency source and clocking connections, interrupt and reset inputs and input and output ports respectively for a plurality of input signals and a plurality of output signals, said method serving for controlling said microprocessor in operations thereof which require taking input signals respectively at said input ports at irregular mutually intersecting intervals for initiation thereby of time-critical brief program routines and comprising the steps of:

assigning in said random access memory at least one said storage register for each of a plurality of said input signals present respectively at said input ports; each of said assigned registers having a carry out state recognizable by said microprocessor;

generating timing signals at a constant frequency substantially lower than said microprocessor clock frequency and using all of said timing signals as interrupt signals supplied to said interrupt input of said microprocessor for initiating a time-critical routine of altering the numerical content of each of said assigned registers;

immediately after the appearance, at said interrupt input, of each of said interrupt signals supplied at regular intervals, performing, for at least one of a first portion of said assigned registers, the substeps of:

determining whether said at least one of said first portion of said assigned registers is in a carry out state, if so, producing a change of state in one of said output signals at one of said output ports and if not, transferring the content of said at least one register to an accumulator of said microprocessor, altering the value of said content of said at least one of said first portion of said assigned registers by one unit in a predetermined direction of alteration and transferring said altered content to said at least one of said first portion of said assigned registers; and reading at least one (21) of a second portion of said assigned registers if a second input signal (P) of said input signals is in a first predetermined state of two possible states thereof after having been in the second of said two states right after the previous one of said interrupt signals;

resetting said at least one (21) register of said second portion of said assigned registers if said second input signal (P) of said input signals is in said second state thereof after having been in said first state thereof right after the last previous one of said interrup signals; and thereafter returning the operation of said microprosessor to said program thereof at the stage of said program reached at the time of the said interrupt signal which initiated the substeps above recited.

11. Method according to claim 10, wherein said substeps performed prior to return to said program further includes:

upon recognition that said at least one register of said first portion of said assigned registers is in a carry out state, writing in a predetermined count value content into said at least one register.

12. Method according to claim 11, wherein said substep of writing in a predetermined count value content into said at least one register is performed by writing in different first and second count values in alternation in successive routines respectively initiated by successive interrupt signals supplied at regular intervals and wherein the recognition of said carry out state of said at least one regiister is used for timing the duration of a particular state of a corresponding one of said output signals and the length of an interval between successive occurrences of said particular state thereof.

13. Method according to claim 12, wherein said substeps performed prior to return to said program further include:

determining whether a first input signal (G) of said input signals is in a predetermined first state of two possible states thereof;

if said first input signal is in said first state, transferring the content of a first register (19) of a second portion of said assigned registers to an accumulator of said microprocessor, altering the value of said register content by one unit in a predetermined direction of alteration and transferring said altered content to said first register (19);

determining whether said first input signal (G) is in the second of its two possible states after having been in said first state thereof right after the last previous interrupt signal of said interrupt signals supplied at regular intervals and in that event reading out and storing the content of said first register (19) followed by restoring the content of said register to a predetermined initial count value content;

and wherein said program provides first and second limit values of the content read out of said first register (19) and provides for comparing said stored read out content of said first register after return of said microprocessor to said program and further provides, in response to the said comparing step, for reducing the frequency of said timing signals when said first limit value is reached after previous read out values lying between said limit values and for increasing the frequency of said timing signals when said second limit value is reached after previous readout values lying between said limit values.

14. Method according to claim 13 in which the step of reducing the frequency of said timing signals is performed by halving said frequency and the step of increasing said frequency is performed by doubling said frequency.

15. Method according to claim 13, wherein the step of increasing said frequency is made subject to an upper limit of said frequency.

16. Method according to claim 13, wherein said frequency of said timing signals is derived from the clock frequency of said microprocessor.

17. Method according to claim 10, wherein said frequency of said timing signals is derived from the clock frequency of said microprocessor.

* * * * *